(12) United States Patent
Gerber

(10) Patent No.: US 6,928,836 B2
(45) Date of Patent: Aug. 16, 2005

(54) METHOD FOR CENTERING A GLASS FLOW CONTROL TUBE

(75) Inventor: Stephen M. Gerber, Traverse City, MI (US)

(73) Assignee: Owens-Brockway Glass Container Inc., Toledo, OH (US)

( * ) Notice: Subject to any disclaimer, the term of this patent is extended or adjusted under 35 U.S.C. 154(b) by 0 days.

(21) Appl. No.: 10/822,412

(22) Filed: Apr. 12, 2004

(65) Prior Publication Data

US 2005/0028557 A1 Feb. 10, 2005

Related U.S. Application Data

(62) Division of application No. 10/161,231, filed on May 31, 2002, now Pat. No. 6,758,065.

(51) Int. Cl.[7] .................................... C03B 5/26
(52) U.S. Cl. ................................ 65/29.12; 65/29.17
(58) Field of Search ........................... 65/29.12, 29.17

(56) References Cited

U.S. PATENT DOCUMENTS

| | | | |
|---|---|---|---|
| 3,239,326 A | 3/1966 | Tyner | |
| 3,334,986 A | 8/1967 | Davey | |
| 3,582,309 A | 6/1971 | Bracken | |
| 3,866,829 A | 2/1975 | Egawa | |
| 3,874,866 A | 4/1975 | Iacovazzi | |
| 3,918,167 A | 11/1975 | Gerber | |
| 4,514,209 A | 4/1985 | Mumford | |
| 4,554,000 A | 11/1985 | Suomaia | |
| 4,594,763 A | 6/1986 | Frazee | |
| 4,832,725 A | 5/1989 | Rehring | |
| 5,266,093 A | 11/1993 | Konishi | |
| 5,540,747 A | 7/1996 | Scott | |
| 5,660,610 A | 8/1997 | DiFrank et al. | |
| 6,151,918 A | 11/2000 | DiFrank | |
| 6,758,065 B1 * | 7/2004 | Gerber | ........................ 65/158 |

* cited by examiner

Primary Examiner—Sean Vincent

(57) ABSTRACT

An apparatus for indicating concentricity of a rotatable glass flow control tube with respect to its axis of rotation on a tube support frame in a glassware forming system includes a base for securement on the tube support frame and a slide mounted on the base for radial movement toward and away from an outside surface of the glass flow control tube. A roller is positioned on the slide for rolling engagement with the outside surface of the flow control tube as it rotates on the frame, and an indicator is coupled to the slide for indicating radial movement of the slide, indicative of radial movement of the tube outside surface with respect to its axis of rotation, as the tube is rotated on the tube support frame.

3 Claims, 6 Drawing Sheets

US 6,928,836 B2

METHOD FOR CENTERING A GLASS FLOW CONTROL TUBE

This application is a division of application Ser. No. 10/161,231 filed May 31, 2002 now U.S. Pat. No. 6,758,065.

The present invention is directed to glassware manufacture, and more particularly to a method and apparatus for centering a glass flow control tube with respect to its axis of rotation within a glass spout.

BACKGROUND AND OBJECTS OF THE INVENTION

The art and science of glassware manufacture typically involves flow of molten glass from a furnace and a forehearth through one or more orifices in a spout. After flow through the orifice(s), the glass stream is severed by shears into individual gobs, which are fed to individual sections and molds of a glassware forming machine. A cylindrical flow control tube is positioned within the spout, and is movable axially to vary the gap between the lower edge of the tube and the upper surface of the spout bottom to control the amount of glass that flows from the spout. The glass flow control tube also rotates about its axis. It is important that the tube be positioned so that the axis of the tube is coincident or as closely coincident as possible with the axis of rotation of the tube in order to ensure uniform quantity of glass flow to and through the spout orifice(s). It is a general object of the present invention to provide a method and/or an apparatus for measuring concentricity of the flow control tube with respect to its axis of rotation, and preferably for helping to center the flow control tube with respect to its axis of rotation.

An apparatus for indicating concentricity of a rotatable glass flow control tube with respect to its axis of rotation on a tube support frame in a glassware forming system, in accordance with a first aspect of one presently preferred embodiment of the invention, includes a base for securement on the tube support frame and a slide mounted on the base for radial movement toward and away from an outside surface of the glass flow control tube. A roller is positioned on the slide for rolling engagement with the outside surface of the flow control tube, and an indicator is coupled to the slide for indicating radial movement of the slide, indicative of eccentricity of the tube outside surface with respect to its axis of rotation, as the tube is rotated on the tube support frame.

An apparatus for indicating concentricity of a rotatable glass flow control tube with respect to its axis of rotation on a tube support frame in a glassware forming system, in accordance with a second aspect of the present invention, includes a base with a first section for securement on the tube support frame and a second section movably mounted on the first section. A slide is mounted for axial movement on the second section toward and away from an outside surface of a glass flow control tube mounted on the frame, and a roller is positioned on the slide for rolling engagement with the outside surface of the tube as the tube is rotated on the frame. A spring is captured in compression between the slide and the base for urging the slide and the roller against the outside surface of the flow control tube. A releasable lock on the base is provided for selectively locking the second section to the first section of the apparatus in a position for radial engagement of the roller with the outer surface of the flow control tube. An indicator is coupled to the slide for indicating movement of the slide with respect to the second section, indicative of radial eccentricity of the tube outer surface with respect to its axis of rotation, as the tube is rotated on the tube support frame.

A method of indicating concentricity of a rotatable glass flow control tube with respect to the axis of rotation of the tube on a tube support frame in a glassware forming system, in accordance with a third aspect of the present invention, includes mounting a base on the tube support frame and positioning a slide on the base in radial engagement with an outside surface of the flow control tube. The flow control tube is rotated with respect to the frame while maintaining the slide in radial engagement with the outer surface of the tube. An indication of eccentricity of the flow control tube outer surface with respect to the frame is provided as a function of movement of the slide with respect to the base.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figure 1:
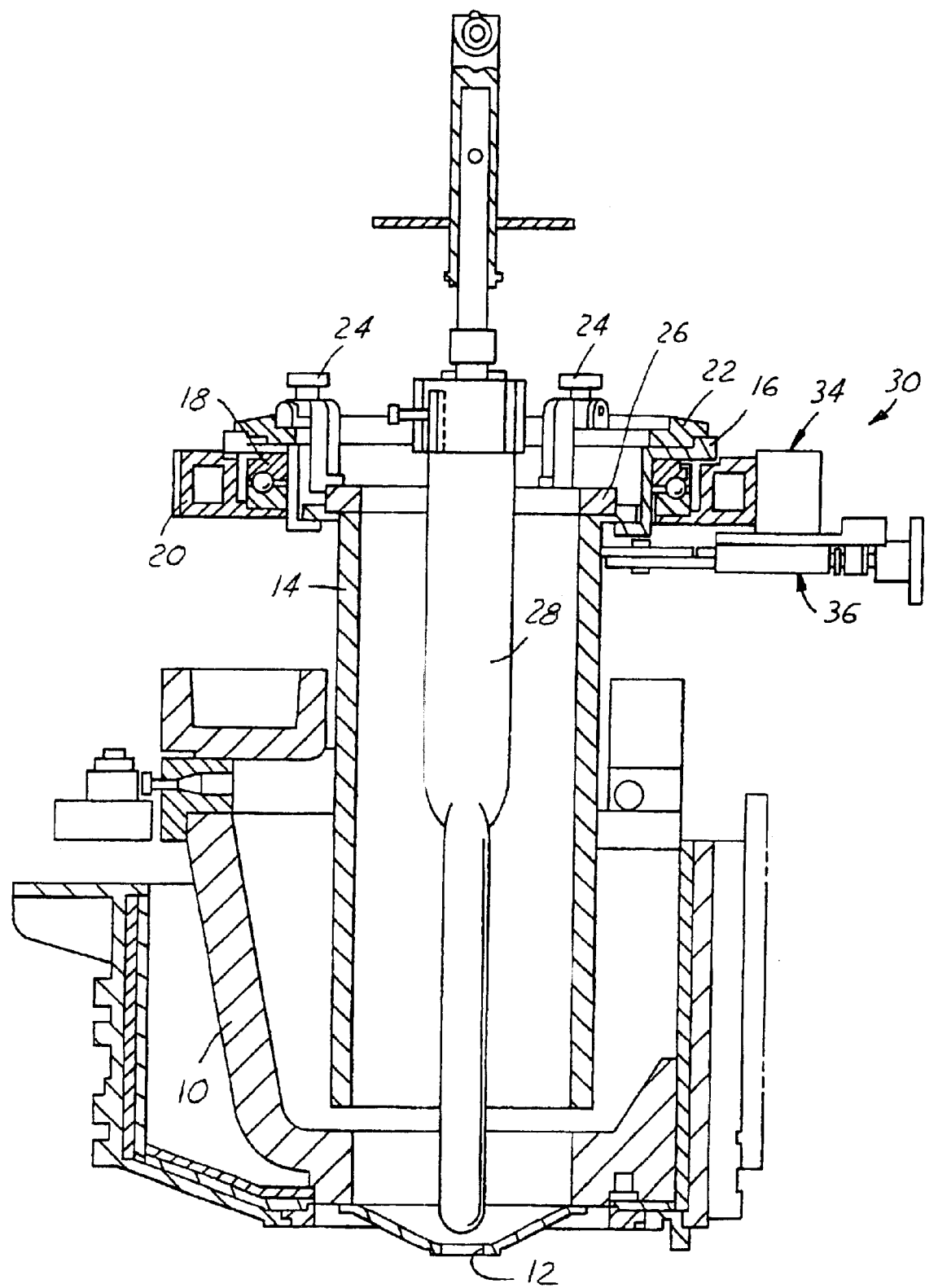
FIG. 1 is a sectioned elevational view of a glass spout, flow control tube and plunger arrangement that includes an apparatus for measuring concentricity of the flow control tube with respect to its axis of rotation in accordance with a presently preferred embodiment of the invention.

FIG. 1 illustrates a glass spout 10 through which glass flows from a furnace and a forehearth (not shown) through one or more spout orifice(s) 12 to forming equipment (not shown) in a glassware forming system. A glass flow control tube 14 is carried by a tube holder 16. Tube holder 16 is mounted by bearings 18 on a tube support frame 20. A gear 22 on tube holder 16 is coupled to a motor for rotation of tube holder 16 and tube 14. Control tube 14 is secured within holder 16 by a series of clamps 24 and a clamp ring 26. Control tube 14 may thus be rotated within spout 10 about an axis determined by tube holder 16. Control tube 14 may also be moved in the direction of its axis toward and away from the opposing surface of spout 10 for controlling the rate of glass flow through orifice(s) 12. One or more plungers 28 are disposed within tube 14 and axially movable with respect to associated orifice(s) 12 for assisting glass flow through the orifices and contouring the profile of the glass stream(s). As noted above, it is important that the central axis of tube 14, which is cylindrical in geometry, be as close as possible to being concentric with its axis of rotation within tube holder 16 and frame 20 for maintaining uniformity of glass flow between the lower end of the flow control tube and the opposing inside surface of the spout.

Figure 7:
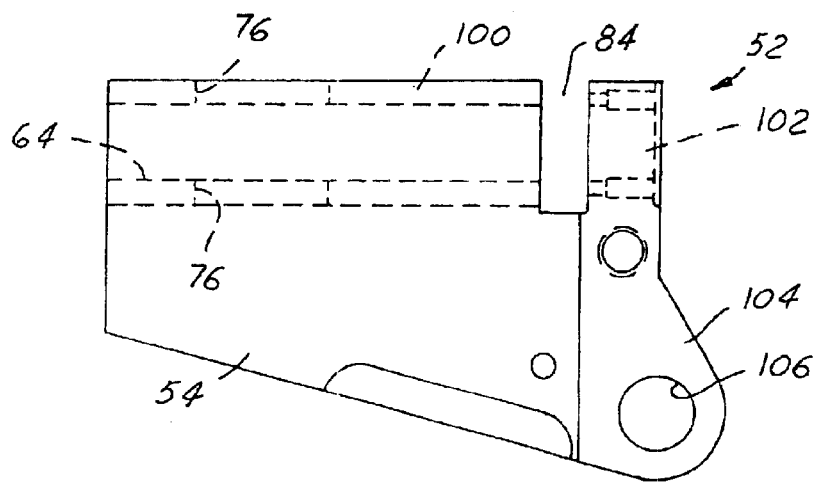
FIGS. 7 and 8 are top plan and side elevational views of the support bracket 52 in FIGS. 2–6.
Figure 8:
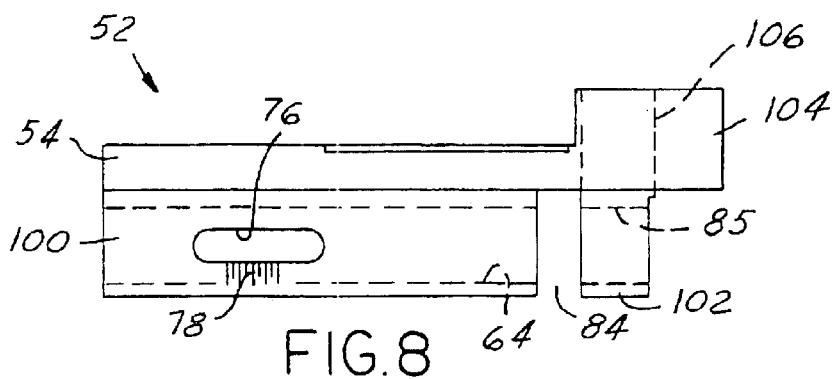
Figure 9:
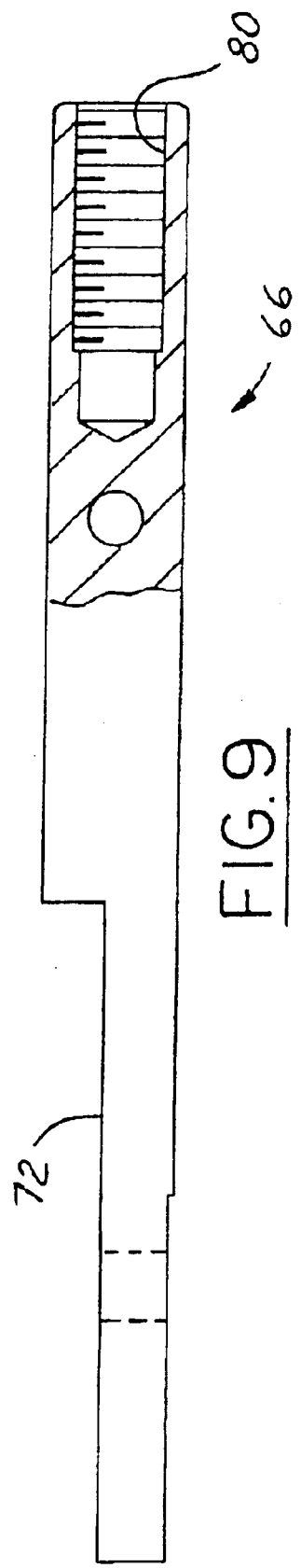
FIG. 9 is a partially sectioned elevational view of the slide 66 in FIGS. 2–3A.

In accordance with an exemplary but presently preferred embodiment of the present invention illustrated in the drawings, an apparatus 30 is mounted on tube support frame 20 for engaging the outside surface of control tube 14 as it rotates, and for indicating concentricity (eccentricity) of the flow control tube with respect to its axis of rotation. Apparatus 30 includes a base having a first section 34 secured to tube support frame 20 and a second section 36 that is movable with respect to first section 34. First section 34 includes a pipe 38 or other suitable support threaded into or otherwise secured to support frame 20. A clamp block 40 (FIGS. 2 and 4–5) encircles and is clamped to pipe 38, by means of a split 42 in block 40 and a series of screws 44 that extend through the clamp block across the split for securing clamp block 40 to pipe 38. A plate 46 is secured to the underside of clamp block 40 by means of screws 48. Plate 46 extends laterally from clamp block 40, and a pivot pin 50 is welded or otherwise fixedly secured to plate 46 so as to project vertically upwardly from the plate. (Directional words such as "upwardly" and "downwardly" are used by way of description and not limitation with respect to the vertical orientation of the assembly illustrated in FIGS. 1 and 3–5.) Second base section 36 includes a support bracket 52. As best seen in FIGS. 7–8, support bracket 52 includes a generally flat base 54. An elongated guide block 100 extends along one edge of base 54. A bore 64 extends through block 100, and a slot 76 extends laterally through block 100 and bore 64. A second block 102 has a through bore 85 that is aligned with bore 64 in block 100. Block 102 is separated from block 100 by a gap 84. An enlargement 104 in base 54 is spaced from blocks 100, 102, and has a vertical opening 106.

Opening 106 in base 54 of support bracket 52 is pivotally received over pin 50, so that second base section 36 is pivotable about the axis of pivot pin 50 with respect to plate 46 and first section 34. A spring lock 56 is mounted on base 54 of bracket 52. Lock 56 includes a spring-biased plunger 58 that extends from the lock (FIG. 4) into an opening 60 in plate 46 for locking second base section 34 in the position illustrated in the drawings. Plunger 58 may be selectively retracted by means of lock handle 62 to allow pivoting of second base section 36 away from first base section 34, as will be described. Apparatus section 36 can also be removed from base section 34 by sliding support bracket 52 off of pin 50. A slide 66 (FIGS. 2–3A and 9) is disposed for axial sliding movement in bore 64 of support bracket 52, which is preferably a cylindrical bore.

A roller 68 is secured by a screw 70 within a recessed shoulder 72 on one end of slide 66 for rolling engagement with the outer surface of flow control tube 14. A roll pin 74 (FIGS. 2 and 3) extends from opposite sides of slide 66 through laterally aligned slots 76 in bracket 52. Pin 74 not only removable secures slide 66 in position on bracket 52, but also cooperates with graduations 78 (FIG. 3) or other suitable indicia on the outer surface of block 100 adjacent to slot 76 for helping to indicate the amount of movement of slide 66 and roller 68 with respect to bracket 52. The opposing or outer end of slide 66 has an internally threaded opening 80 (FIGS. 3A and 9) into which an externally threaded screw shaft 82 is threadably received. Screw shaft 82 extends across gap 84 between blocks 100, 102 on bracket 52, and then through bore 85 in block 102. A knob 86 is secured by a pin 88 to the end of screw shaft 82. A coil spring 90 encircles screw shaft 82 within bore 85 of block 102. At one end, spring 90 engages a spring retainer 92 externally secured to block 102 over bore 85. At the opposing end, spring 90 engages a washer 94 that abuts a pin 96 which extends through screw shaft 82. Spring 90 is thus captured in compression between retainer 92 secured to block 102 and pin 96 secured to screw shaft 82. Spring 90 resiliently urges screw shaft 82 and slide 66 in a direction to bring roller 68 into rolling engagement with the outer surface of control tube 14.

Figure 2:
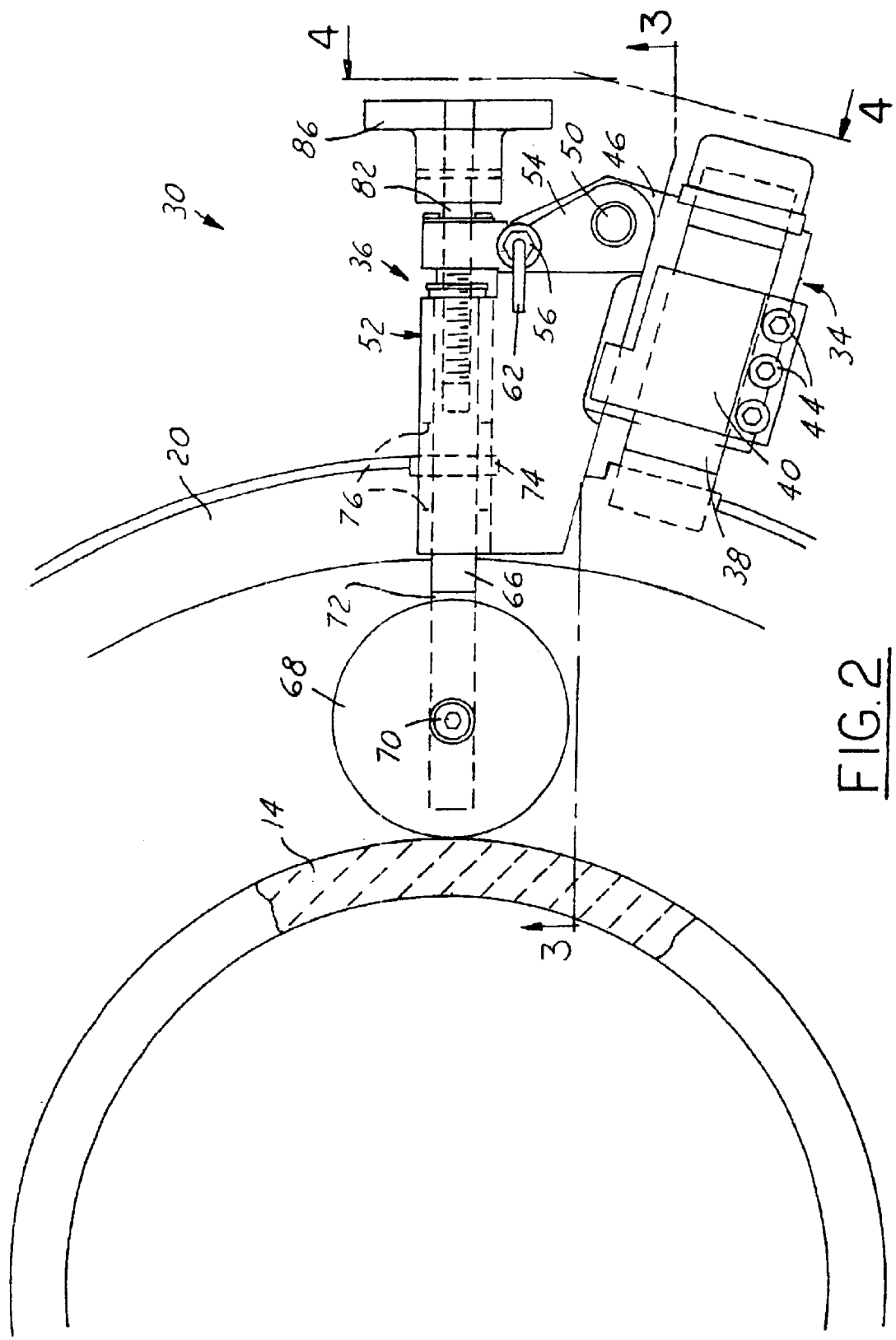
FIG. 2 is a fragmentary top plan view of the flow control tube and apparatus of FIG. 1.
Figure 3:
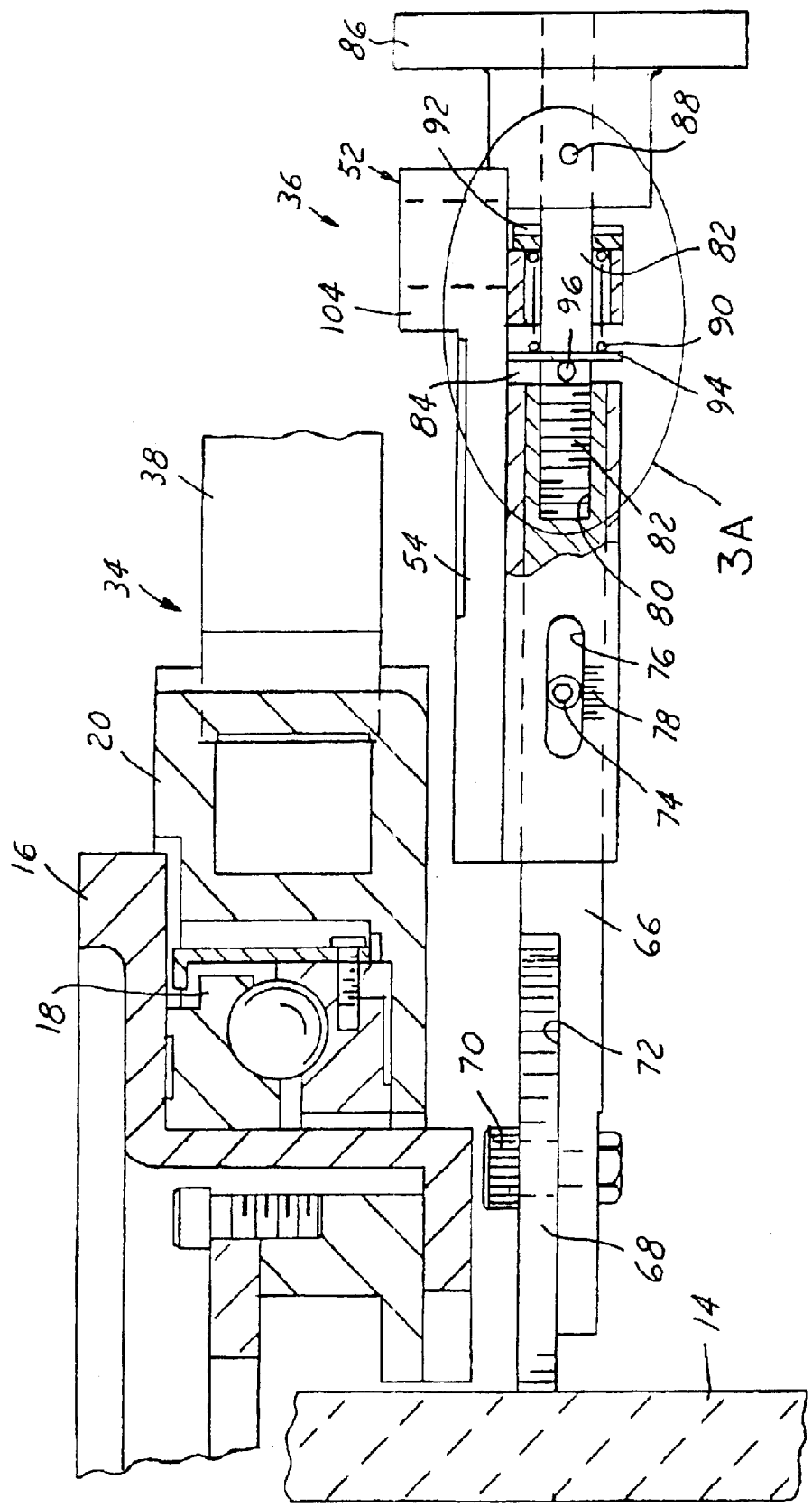
FIG. 3 is a sectional view taken substantially along the line 3—3 in FIG. 2.
Figure 3A:
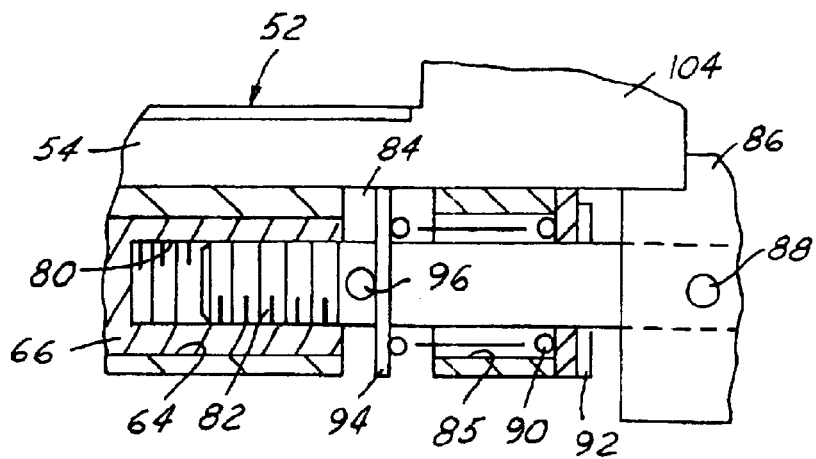
FIG. 3A is an enlarged view of the portion of FIG. 3 within the area 3A.
Figure 4:
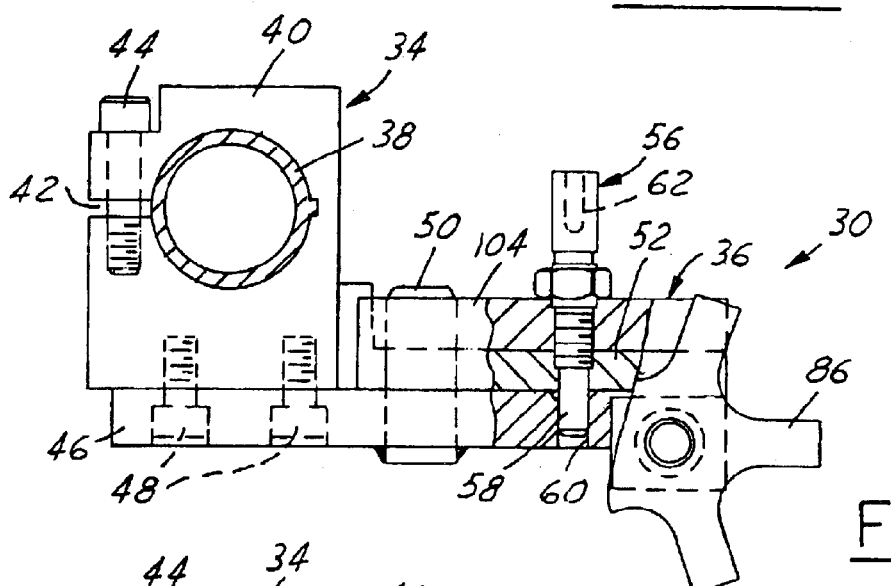
FIG. 4 is a side elevational view taken substantially along the line 4—4 in FIG. 2.

In use to indicate concentricity of the glass flow control tube with respect to the tube support frame, section 36 is positioned with respect to base section 34 as illustrated in FIGS. 1–3. Knob 86 is rotated to move slide 66 within bracket 52 and bring roller 68 into engagement with the outer surface of the flow control tube. The flow control tube is typically of ceramic material, and preferably is provided with a machined outer surface area for engagement by the roller, with the machined surface area being concentric with the central axis of the tube. The tube is then rotated in the usual manner within the tube support frame, and the position of pin 74 within slot 76 is observed by the operator. Movement of pin 74 inwardly and outwardly during rotation of the flow control tube indicates an absence of concentricity (i.e, an eccentricity) between the central axis of the tube and its axis of rotation, with indicia 78 on body 52 providing a measure of such eccentricity. This eccentricity can also be observed as motion of washer 94 within gap 84. Clamps 24 (FIG. 1) are then loosened and the position of flow control tube 14 is readjusted within tube holder 16. Manual adjustment may be accomplished by slightly loosening clamps 24 and rotating the flow control tube. Knob 86 is turned until spring 90 is fully compressed and washer 94 abuts block 102 of bracket 52. Additional turning of knob 86 and shaft 82 pushes tube 14 to the left in FIGS. 2 and 3. If this is done slowly while tube 14 is rotating, any eccentricity with respect to the axis of rotation will be visible as undulating motion at washer 94, pin 96 and pin 74. The position of the flow control tube can alternatively be adjusted by direct manual engagement with the flow control tube, and the tube again rotated while pin 74 and or washer 94 is observed to indicate whether concentricity has been achieved through such adjustment. After use, lock 56 may be released and base section 34 swung out of the way (clockwise about pin 50 in FIG. 2). Once swung out, section 36 can be removed by lifting the section off of pin 50 for off-line storage or use in another glass machine.

Figure 5:
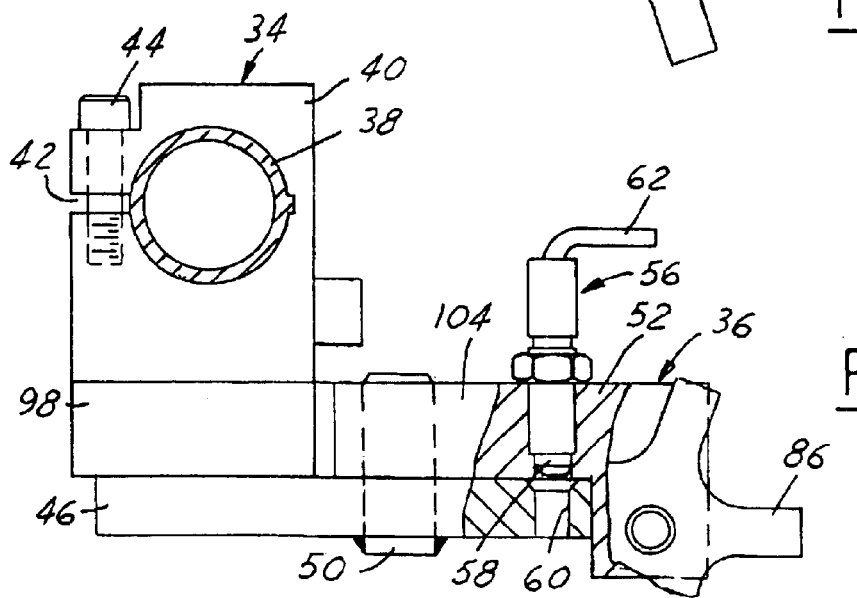
FIG. 5 is an elevational view similar to that of FIG. 4 but showing release of the lock for swinging the measurement apparatus away from the flow control tube.
Figure 6:
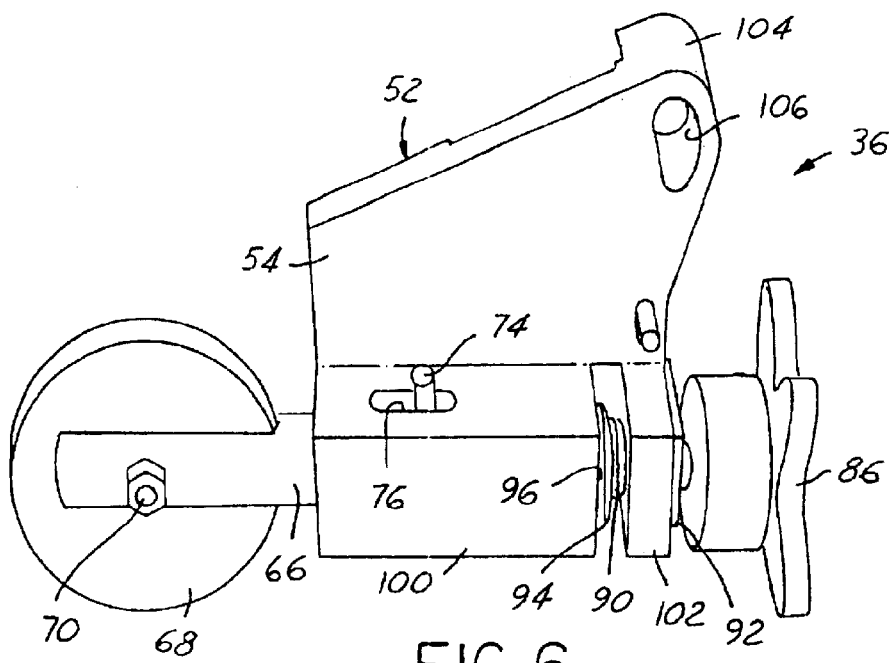
FIG. 6 is a bottom perspective view of a portion of the apparatus illustrated in FIGS. 1–5.

There have thus been described a method and apparatus that fully achieve all of the objects and aims previously set forth. A number of modifications and variations have been discussed, and other modifications and variations will readily suggest themselves to persons of ordinary skill in the art. For example, FIG. 5 illustrates a modification in which a spacer block 98 is positioned between clamp block 40 and plate 46 for use in conjunction with flow control tubes having a lower machined centering band on the tube. Visual observation of pin 74 relative to indicia 78 maybe readily replaced by an electronic position sensor coupled to suitable electronics for providing a readout display of slide movement, including a measure of control tube eccentricity in suitable units such as inches or centimeters. Likewise, manual movement of the slide can be replaced by an automatic operation in which motion at the slide is monitored by a sensor, and control electronics and a suitable actuator are responsive to the sensor for moving the slide and roller radially inwardly or outwardly. The invention is intended to embrace all such modifications and variations as fall within the spirit and broad scope of the appended claims.

What is claimed is:

1. A method of indicating concentricity of a rotatable glass flow control tube with respect to the axis of rotation of the tube on a tube support frame in a glassware forming system, which includes:
   (a) mounting a base on the tube support frame,
   (b) positioning a slide on said base in radial engagement with an outside surface of the flow control tube,
   (c) rotating the flow control tube with respect to the frame while maintaining said slide in radial engagement with the outside surface of the flow control tube, and
   (d) providing an indication of eccentricity of the flow control tube outside surface with respect to the axis of rotation of the tube on the frame as a function of movement of said slide with respect to said base.

2. The method set forth in claim 1 wherein said step (b) includes positioning a spring on said base for urging said slide against the outside surface of the flow control tube.

3. The method set forth in claim 2 comprising the further step of: (e) adjusting position of the tube with respect to the frame by loosening clamps that secure the tube to the frame, and pushing said slide against said tube while observing said indication of eccentricity.

* * * * *